United States Patent
Chua

(10) Patent No.: US 9,786,106 B2
(45) Date of Patent: Oct. 10, 2017

(54) SECURITY CONTROL SYSTEM FOR GRANTING ACCESS AND SECURITY CONTROL METHOD THEREOF

(71) Applicant: CONCORDE ASIA PTE. LTD., Singapore (SG)

(72) Inventor: Swee Kheng Chua, Singapore (SG)

(73) Assignee: CONCORDE ASIA PTE. LTD., Singapore (SG)

( * ) Notice: Subject to any disclaimer, the term of this patent is extended or adjusted under 35 U.S.C. 154(b) by 0 days.

(21) Appl. No.: 15/321,986

(22) PCT Filed: Jun. 25, 2014

(86) PCT No.: PCT/SG2014/000302
§ 371 (c)(1),
(2) Date: Dec. 23, 2016

(87) PCT Pub. No.: WO2015/199609
PCT Pub. Date: Dec. 30, 2015

(65) Prior Publication Data
US 2017/0140584 A1     May 18, 2017

(51) Int. Cl.
*G05B 19/00* (2006.01)
*G05B 23/00* (2006.01)
(Continued)

(52) U.S. Cl.
CPC ......... *G07C 9/00111* (2013.01); *G06K 7/087* (2013.01); *G06K 7/10366* (2013.01); *G06K 7/1413* (2013.01); *G06K 7/1417* (2013.01)

(58) Field of Classification Search
CPC .. G06K 7/087; G06K 7/10366; G06K 7/1413; G06K 7/1417; G07C 9/00111
(Continued)

(56) References Cited

U.S. PATENT DOCUMENTS

2009/0183541 A1* 7/2009 Sadighi .............. G07C 9/00103
70/263
2010/0127821 A1* 5/2010 Jones ................. G07C 9/00309
340/5.2

(Continued)

FOREIGN PATENT DOCUMENTS

WO     2013034671 A1   3/2013

OTHER PUBLICATIONS

Security token—Wikipedia, the free encyclopedia [retrieved Jun. 16, 2017], Retrived from Internet: <URL: http://en.wikipedia.org/wiki/Security_token>.*

*Primary Examiner* — Nader Bolourchi
(74) *Attorney, Agent, or Firm* — Proskauer Rose LLP

(57) ABSTRACT

The present invention provides a method for granting a visitor access into a premise. The security control method includes determining an identification tag, transmitting the identification tag to the visitor, scanning the identification tag of the visitor, authenticating the identification tag, generating an approving signal upon positive authentication of the identification tag, dispensing an identification token to the visitor upon receiving the approving signal, scanning the identification token of the visitor, and authenticating the identification token to grant the visitor access into the premise. The present invention further provides a security control system for the security control method.

20 Claims, 2 Drawing Sheets

(51) Int. Cl.
   *G06F 7/00* (2006.01)
   *G07C 9/00* (2006.01)
   *G06K 7/14* (2006.01)
   *G06K 7/10* (2006.01)
   *G06K 7/08* (2006.01)

(58) Field of Classification Search
   USPC .......................................................... 340/5.6
   See application file for complete search history.

(56) References Cited

U.S. PATENT DOCUMENTS

2012/0075062 A1    3/2012  Osman et al.
   2013/0214898 A1*   8/2013  Pineau .................... G06F 21/32
                                                    340/5.6

* cited by examiner

SECURITY CONTROL SYSTEM FOR GRANTING ACCESS AND SECURITY CONTROL METHOD THEREOF

CROSS-REFERENCE TO RELATED APPLICATIONS

This application is a national stage application under 35 U.S.C. §371 of international application no. PCT/SG2014/000302, filed Jun. 25, 2014, which is hereby incorporated by reference in its entirety.

TECHNICAL FIELD

The present invention relates to a security control system configured to grant a visitor access into a premise and a security control method thereof.

BACKGROUND

In premises which require security function, it is common to find security personnel at a certain position e.g. a building entrance, reception counter, loading bay, car park entrance etc. of the premise. Usually, there is at least a security guard/concierge in the position to screen visitors whom will use some form of identification in exchange for security passes to enter the premises.

In some cases, the level of security screening is relatively low. The screening of the visitor may not be properly carried out due to the human factors. As such, the registration process at the security position may serve little or no purpose. Further, there is also very little control over the whereabouts/movements of visitors after the issuance of the security passes. It is common to hear that high security premises with well-equipped security devices experience security breaches. To improve security of the premises, the building owners may increase the number of security personnel. However, more often than not, the increase the number of security personnel does not translate to better security in the premises. In some cases, the security personnel does not even screen visitors and let the visitors have free access to the premise. In such case, it is not possible to know who and when entered or left the premises, let alone knowing who has not left the premise after operation hours.

Therefore, it is necessary to implement a security control system and security control method to overcome the problems above.

SUMMARY

According to various embodiments, the present invention provides a security control method for granting a visitor access into a premise. The security control method includes determining an identification tag; transmitting the identification tag to the visitor; scanning the identification tag of the visitor; authenticating the identification tag; generating an approving signal upon positive authentication of the identification tag; dispensing an identification token to the visitor upon receiving the approving signal; scanning the identification token of the visitor; and authenticating the identification token to grant the visitor access into the premise.

According to various embodiments, the security control method includes receiving personal data of the visitor.

According to various embodiments, the security control method further comprises authenticating the personal data.

According to various embodiments, the security control method further comprises receiving the identification token from the visitor.

According to various embodiments, the security control method further includes authenticating the identification token.

According to various embodiments, the security control method includes transmitting the identification tag comprises electronic transmission.

According to various embodiments, the security control method includes scanning the identification tag comprises optically scanning the identification tag.

According to various embodiments, the security control method further includes reproducing the identification tag.

According to various embodiments, reproducing the identification tag includes at least one of printing the identification tag on a printable media or displaying the identification tag on a screen of an electronic device.

According to various embodiments, the identification tag includes an optically readable image.

According to various embodiments, the optically readable image includes at least one of a barcode or a quick response code.

According to various embodiments, scanning the identification token includes at least one of radio-frequency scanning or magnetic scanning.

According to various embodiments, the identification token includes at least one of radio-frequency identification chip or magnetically readable portion.

According to various embodiments, the present invention provides a security control system configured to grant a visitor access into a premise. The security control system includes a determination circuit configured to determine an identification tag; a transmitter configured to transmit the identification tag to a visitor; a first scanner configured to scan the identification tag of the visitor; a first authentication circuit configured to authenticate the identification tag; a generator configured to generate an approving signal upon positive authentication of the identification tag; a dispenser configured to dispense an identification token; a second scanner configured to scan the identification token; and a second authentication circuit configured to authenticate the identification token to grant the visitor access into the premise.

According to various embodiments, the security control system is configured to receive personal data of the visitor.

According to various embodiments, the first authentication circuit is configured to authenticate the personal data.

According to various embodiments, the security control system further includes a receiver adapted to receive the identification token.

According to various embodiments, the identification tag includes an optically readable image.

According to various embodiments, the optically readable image includes at least one of a barcode or a quick response code.

According to various embodiments, the identification token includes at least one of a radio-frequency identification chip or magnetically readable portion.

The present invention provides a security control system and a security control method to overcome the problems mentioned above. The present invention provides a higher level of security screening to a premise and accounts for the whereabouts of visitors within the premise. The security control system and security control method may also allow minimal, if not, does not require security personnel to be at the security positions. In this way, the demand for manpower can be reduced thereby providing cost savings in manpower resource.

The security control system of the present invention provides a Self Service Kiosk which can be used to complement existing security systems as it may be used hand in hand with security systems using identification tokens, e.g. security pass, and gantry access to dispense identification tokens. Self Service Kiosk may be used together with a security access system, e.g. security pass system, to become a Security Kiosk, which is an integration of the building security access system and the Self Service Kiosk. Self Service Kiosk may be used to enhance existing security access systems and may be used to overcome the disadvantages of the present security scenarios as described in the beginning and provide a better security screening procedure and minimizes security lapse. It is an object of the present invention to achieve high security screening e.g. achieving 100% security screening, and to provide a highly reliable security solution to ensure better access control and movement monitoring of visitors within the premise.

DETAILED DESCRIPTION

Figure 1:
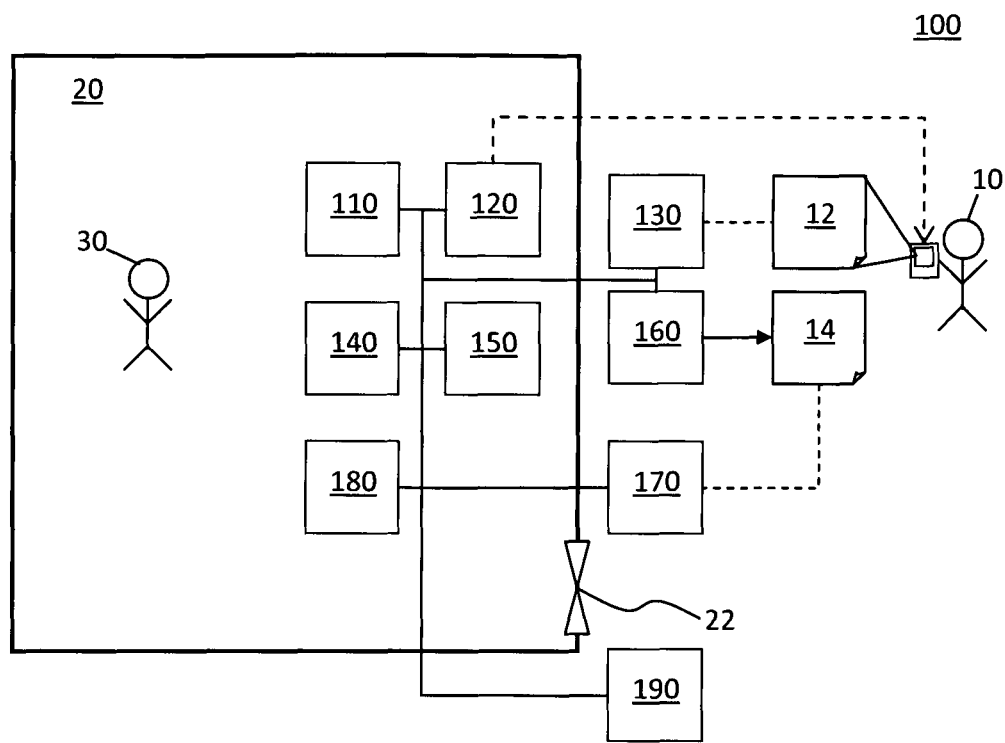
FIG. 1 shows a schematic diagram of a security control system according to various embodiments.

FIG. 1 shows a security control system 100. Security control system 100 is configured to grant a visitor 10 access into a premise 20, e.g. compound, building, office. Security control system 100 includes a determination circuit 110 configured to determine an identification tag 12, a transmitter 120 configured to transmit the identification tag 12 to a visitor 10, a first scanner 130 configured to scan the identification tag 12 of the visitor 10, a first authentication circuit 140 configured to authenticate the identification tag 12, a signal generator 150 configured to generate an approving signal upon positive authentication of the identification tag 12, a dispenser 160 configured to dispense an identification token 14, a second scanner 170 configured to scan the identification token 14 and a second authentication circuit 180 configured to authenticate the identification token 14 to grant the visitor 10 access into the premise 20.

In other words, the security control system 100 can be a self-service kiosk for issuing an identification token, e.g. security pass, to a visitor. Security control system 100 allows a host 30 from the premise 20 to issue an identification tag 12 to a visitor 10 beforehand, e.g. before reaching the premise 20, and allows the visitor 10 to use the identification tag 12 to exchange for an identification token 14 so as to gain access into the premise 20. Host 30 may be a person who initiates the transmission of the identification tag 12. Host 30 may be a tenant of the premise and/or a security personnel. Security control system 100 may determine an identification tag 12 when requested by the host 30. Upon determining the identification tag 12, the host may transmit the identification tag 12 to the visitor 10 using the transmitter 120. Visitor 10 may scan the identification tag 12 at the first scanner 130 when the visitor 10 is at the premise 20. When scanned, the first authentication circuit 140 authenticates the identification tag 12 to determine if the identification tag 12 is valid.

If so, an approving signal will be sent to the dispenser 160 to dispense the identification token 14. Visitor 10 may then use the identification token 14 to gain access into the premise 20.

Security control system 100 may include a registration module (not shown in FIG. 1) for registering the identity of the host 30 when initiating the determination and transmission of the identification tag 12 to the visitor 10. Host 30 may have a security access code, e.g. password, to log on to the registration module before the initiation. When the host 30 logs on to the registration module to initiate the determination and transmission, the security control system 100 would be able to capture the personal data of the host 30 which is tagged to the security access code to identify the host 30. In this way, it is possible to retrieve the identity of the person who authorizes the access of a visitor.

Determination circuit 110 may be connected to the transmitter 120. Determination circuit 110 may be connected to the transmitter 120 via a bus, e.g. wire, optical fibre. Determination circuit 110 may determine an identification tag 12 and transmit the identification tag 12. Determination circuit 110 may transmit an identification tag electronically to the transmitter 120. Transmitter 120 may then transmit the identification tag 12 electronically to the visitor 10.

Figure 2:
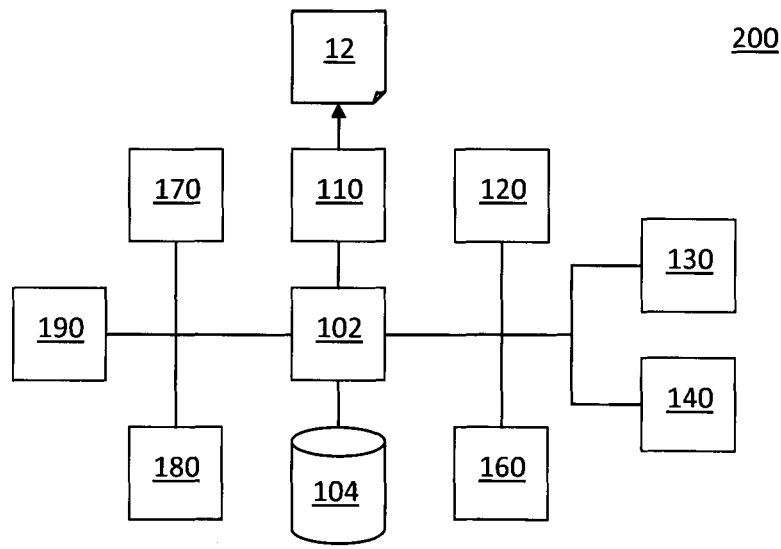
FIG. 2 shows a schematic diagram of a security control system according to various embodiments.

FIG. 2 shows a schematic diagram according to various embodiments. As shown in FIG. 2, the determination circuit 110 may be connected to a central processor 102, e.g. a CPU, configured to process signals. Central processor 102 may be connected to a data storage 104 configured to store data, e.g. identification tag, visitor personal and access data. Determination circuit 110 may generate the identification tag 12. Determination circuit 110 may retrieve the identification tag 12 from the data storage 104.

Transmitter 120 may be an electronic device configured to transmit the identification tag 12 to the visitor 10. Transmitter 120 may be connected to the central processor 102. Transmitter 120 may be a computer terminal having email application configured to allow a host 30 to transmit email to the visitor 10. Transmitter 120 may be a communication device configured to allow the host 30 to transmit the identification tag 12, e.g. an image, to the visitor. Communication device may be a mobile device, e.g. mobile phone.

Identification tag 12 may include an optically readable image. Optically readable image may include at least one of a barcode or a quick response code. Optically readable image may be transmitted via the internet or mobile communication system. Optically readable image may be transmitted via email to a visitor or via short message service (SMS) or the like.

First scanner 130 may be an optical scanner configured to scan the identification tag 12. Visitor 10 may reproduce the identification tag 12 for the purpose of having the identification tag 12 scanned by the first scanner 130. First scanner 130 may be an image capturing device, e.g. camera. As shown in FIG. 2, the first scanner 130 may be connected to the central processor 102 such that the first scanner 130 may transmit an image signal of the identification tag 12 to the central processor 102. Central processor 102 may transmit the image signal to the first authentication circuit 140.

Visitor 10 may reproduce the identification tag 12 by printing it onto a printable media, e.g. paper, or displaying identification tag 12 onto the screen of a mobile device, e.g. mobile phone. For a printable media, the first scanner 130 may be an optical scanner to scan the identification tag 12 or an image capturing device to capture the identification tag 12. For a screen of a mobile device displaying the identification tag 12, the first scanner 130 may be an image capturing device for capturing an image of the identification tag 12 on screen before authenticating it.

Security control system 100 may be configured to receive personal data of the visitor 10. Host 30 may request for personal data of visitor 10 to be provided for authentication and/or recording purpose. Personal data may be stored in the data storage 104.

First authentication circuit 140 may be configured to authenticate the identification tag 12 upon receiving the image signal. First authentication circuit 140 may be connected to the central processor 102. Central processor 102 may retrieve authentication data of identification tag 12 from the data storage 104. First authentication circuit 140 may authenticate the image signal of the identification tag 12 based on the authentication data. First authentication circuit 140 may be connected to the signal generator 150 such that upon positive authentication of the image signal, the first authentication circuit 140 may activate the signal generator 150 to generate an approving signal. Signal generator 150 may be connected to the central processor 102. First authentication circuit 140 may be connected to the dispenser 160. Upon generating the approving signal, the signal generator 150 may transmit the approving signal to the dispenser 160 to dispense the identification token 14.

First authentication circuit 140 may be configured to authenticate the personal data of the visitor 10. At the time of scanning the identification tag 12, a terminal having a user interface may be provided for the visitor 10 to enter personal data. Upon receipt of the personal data, the first authentication circuit 140 may authenticate the personal data based on the personal data store in the data storage 104. Upon positive authentication of the identification tag 12 and the personal data, the first authentication circuit 140 may activate the signal generator 150 to generate an approving signal. First authentication circuit 140 may be connected to the dispenser 160. Upon generating the approving signal, the signal generator 150 may transmit the approving signal to the dispenser 160 to dispense the identification token 14.

Dispenser 160 may be a dispensing machine configured to dispense identification tokens 14. Visitor 10 may receive the identification token 14 from the dispenser 160 upon scanning and positive authentication of the identification tag 12. Dispenser 160 may be configured to encode the identification token 14 with access data, e.g. personnel information, time and date, duration of access. Dispenser 160 may be connected to the central processor 102 to retrieve or send data from or to the central processor 102.

Identification token 14 may include an optically readable image. Optically readable image may include at least one of a barcode or a quick response code. Identification token 14 may be a magnetic token whereby the identification token 14 may be "scanned" magnetically. Identification token 14 may include a magnetically readable portion. Identification token 14 may be a radio-frequency identification (RFID) tag. Identification token 14 may include an RFID chip. Identification token 14 may be in the form of a card, stick, or button, e.g. security pass. Identification token 14 may be embedded with security features in the form of at least one of a micro-chip, magnetic strip or RFID etc. Identification token 14 may be scanned at the second scanner 170.

Second scanner 170 may be at least one of an optical scanner, magnetic scanner or an RFID scanner. Second scanner 170 may be connected to the second authentication circuit 180. Upon scanning the identification token 14, a scanned signal may be transmitted to the second authentication circuit 180 whereby the scanned signal may be authenticated. Second authentication circuit 180 may be connected to the central processor 102. Central processor 102 may retrieve authentication data from the data storage 104 via the central processor 102 and authentication of the scanned signal of the identification token 14 may be based on the authentication data. Upon positive authentication of the identification token 14, the visitor 10 may be allowed access into the premise 20.

Premise 20, as shown in FIG. 1, may include a gate 22 adapted to control the access of the visitor 10 into the premise 20. Security control system 100 may be connected to the gate 22 whereby the security control system 100 is configured to control the operation of the gate 22 between a closed configuration to prevent the visitor 10 from entering the premise 20 and an open configuration to allow the visitor 10 access into the premise 20. Upon positive authentication of the identification token 14, the control gate 22 may be opened to allow the visitor 10 access into the premise. Gate 22 may be a kiosk, turnstile or gantry with anti-tailgating feature, a door etc.

Referring to FIG. 1, the security control system 100 may include a receiver 190 adapted to receive the identification token 14. When a visitor 10 is about to leave the premise 20, the visitor 10 may return the identification token 14 to the receiver 190. Receiver 190 may be configured to identify the identification token 14 and extract access data from the data storage 104 based on the identification token 14, e.g. time of departure, areas visited. Referring to FIG. 2, the receiver 190 may be connected to the central processor 102. Receiver 190 and the dispenser 160 may be connected to each other. Receiver 190 and the dispenser 160 may be housed together such that identification tokens 14 received by the receiver 190 may be transferred to the dispenser 160 to be dispensed to the next visitor. Premise 20 may include scanners therein for the visitor 10 to scan the identification token 14 when the visitor to enter an area, e.g. room, within the premise 20. In this way, the security control system 100 is able to register the time and area when and where the visitor 10 has accessed. Host 30 may have the authority to restrict access to certain areas within the premise 20, e.g. car lift, levels, rooms. In this case, the host 30 may provide the visitor 10 with limited access to only a certain areas within the premise 20. By receiving and registering the identification tokens 14, the security control system 100 is able to find out if there are any more visitors 10 within the premise 20 at the end of a working day or day. At the same time, the security control system 100 would be able to track the movement of the visitor 10 within the premise 20.

Figure 3:
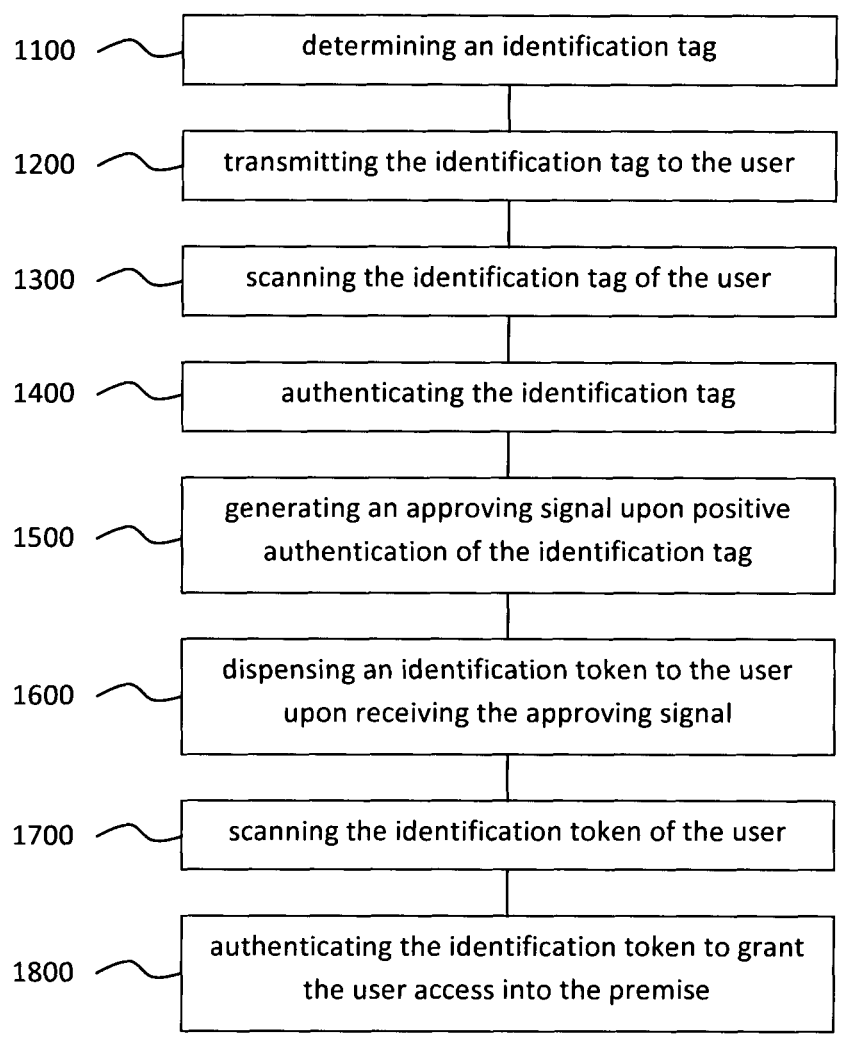
FIG. 3 shows a security control method of using the security control system in FIG. 1

FIG. 3 shows a security control method 1000 for granting the visitor 10 access into the premise 20. In 1100, the identification tag 12 is being determined. Identification tag 12 is being transmitted to the visitor 10 in 1200. In 1300, the identification tag 12 of the visitor 10 is being scanned. In 1400, the identification tag 12 is being authenticated. Upon positive authentication of the identification tag 12, an approving signal is being generated in 1500. In 1600, the identification token 14 is being dispensed to the visitor 10 upon receiving the approving signal. In 1700, the identification token 14 of the visitor 10 is being scanned. In 1800, the identification token 14 is being authenticated so as to grant the visitor 10 access into the premise 20.

FIG. 3 shows the security control method 1000 being used for security purposes. When the host 30 is expecting the visitor 10 to visit the premise 20, the host 30 may determine the identification tag 12 using the determination circuit 110 and transmit the identification tag 12 to the visitor 10 using the transmitter 120. Host 30, who is aware of the date and time of the visit, may define the date and time that the identification tag 12 may be valid for access. Host 30 may also define the duration that the visitor 10 may stay in the premise. Host 30 may transmit the identification tag 12 via electronic transmission. Host 30 may transmit the identification tag 12 via an email or short message from his or her computer terminal and/or mobile device respectively to the visitor 10. Visitor 10 may receive the identification tag 12 on his or her computer terminal and/or mobile device. For additional security, the host 30 may require the visitor 10 to provide personal data for authentication and/or recording purposes. Visitor 10 may then forward the required personal data to the host 30 electronically or via phone. Security control system 100 may then receive personal data of the visitor 10 and store the personal data into the data storage.

Visitor 10, when visiting the premise 20 of the host 30, may reproduce the identification tag 12 by printing the identification tag 12 onto a printable media beforehand or displaying the identification tag 12 onto the screen of an electronic device, e.g. mobile device. Visitor 10 may display the identification tag 12 to be scanned by the first scanner 130.

Identification tag 12 may be scanned optically by the first scanner 130. Scanning the identification token 14 may include radio-frequency scanning and/or magnetic scanning. First scanner 130 may scan the identification tag 12 and transmit an image signal of the identification tag 12 to the central processor 102 which may in turn transmit the image signal to the first authentication circuit 140.

Visitor 10 may be required to provide personal data via the user interface of the terminal. First authentication circuit 140 may authenticate the identification tag 12, and the personal data if necessary, based on the authentication data and personal data stored in the data storage 104. If the authentication is positive, the first authentication circuit 140 may activate the signal generator 150 to generate an approving signal and transmit the approving signal to the dispenser 160 to dispense the identification token 14 to the visitor 10. On the other hand, if the authentication is negative, the security control system 100 will inform the visitor accordingly and deny the visitor 10 access into the premise 20.

Visitor 10, upon receiving the identification token 14, may produce the identification token 14 at the second scanner 170 for scanning. Based on the limitations set out by the host 30, the identification token 14 may be configured to define the duration and areas within the premises that the visitor 10 may stay. Upon scanning, a scanned signal may be transmitted to the second authentication circuit 180 to be authenticated. Identification token 14 may be authenticated. Authentication of the identification token 14 may be based on the authentication data stored in the data storage 104. If the authentication is positive, the gate 22 may be opened to allow the visitor 10 access into the premise 20. However, if the authentication is negative, the gate 22 will remain in the closed configuration to prevent access into the premise 20.

When the visitor 10 is leaving the premise 20, the visitor 10 may return the identification token 14 to the receiver 190. Identification token 14 may be received from the visitor 10 and retained by the receiver 190. When the receiver receives the identification token 14, the receiver 190 may be able to obtain information of the visitor 10, e.g. time when the visitor 10 leaves the premise 20, areas in the premise 20 where the visitor 10 has accessed. Security control system 100 may be configured to notify the host 30 should the visitor 10 stay past a defined duration or a defined end time of the visit. Host 30 may be provided with the authority to postpone the time that the visitor is allowed to stay till. Host 30 may access e.g. log on, the registration module to postpone the time. Security control system 100 may be configured to generate the number of visitors 10 remaining in the premise 20 at any point in time. Security control system 100 may be configured to generate a list of visitor names and/or the location of the visitors at any point in time when requested by the host 30 or a security personnel authorized to do so. In this way, it is possible useful for the host 30 or the security personnel to know who and where a visitor is or the visitors are at any point in time when need be, e.g. during an emergency evacuation.

As shown, the security control method 1000 and security control system 100 provides high security to a premise 20. Visitor 10 to a premise 20 is known beforehand by the host 30. In a way, the visitor 10 is screened by the host 30 before the visit. At the same time, the host 30 knows the visitor 10 before authorizing the visitor 10 entry into the premise 20 and transmitting the identification tag 12 to the visitor 10. Visitor 10 visiting the premise 20 does not require assistance from a security personnel and is able to access the premise 20 at his or her convenience within the allocated time of visit as determined by the host 30. In this way, all visitors 10 to the premise 20 are screened without the risk of not screening any visitor 10. In addition, the location of the visitor 10 at any time may be known to the host 30 and the duration of the visit by the visitor 10 may be known. At the end of each day, the host 30 would be able to know if all the visitors 10 have left the premise 20 so that security overnight would not be compromised by visitors 10 who intentionally stay behind. Visitors 10 may be any person who does not have a valid security permit and wishes to enter the premise, including staffs who are working in the premise.

The security control system 100 may comprise a memory which is for example used in the processing carried out by the security control method. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

The invention claimed is:

1. A security control method for granting a visitor access into a premise comprising:
   determining an identification tag;
   transmitting the identification tag to the visitor;
   scanning the identification tag of the visitor;
   authenticating the identification tag;
   generating an approving signal upon positive authentication of the identification tag;

dispensing an identification token to the visitor upon receiving the approving signal;
scanning the identification token of the visitor; and
authenticating the identification token to grant the visitor access into the premise.

2. The security control method of claim 1, further comprising receiving personal data of the visitor.

3. The security control method of claim 2, further comprising authenticating the personal data.

4. The security control method of claim 1, further comprising receiving the identification token from the visitor.

5. The security control method of claim 4, further comprising authenticating the identification token.

6. The security control method of claim 1, wherein transmitting the identification tag comprises electronic transmission.

7. The security control method of claim 1, wherein scanning the identification tag comprises optically scanning the identification tag.

8. The security control method of claim 1, further comprising reproducing the identification tag.

9. The security control method of claim 8, wherein reproducing the identification tag comprises at least one of printing the identification tag on a printable media or displaying the identification tag on a screen of an electronic device.

10. The security control method of claim 1, wherein the identification tag comprises an optically readable image.

11. The security control method of claim 10, wherein the optically readable image comprises at least one of a barcode or a quick response code.

12. The security control method of claim 1, wherein scanning the identification token comprises at least one of radio-frequency scanning or magnetic scanning.

13. The security control method of claim 1, wherein the identification token comprises at least one of radio-frequency identification chip or magnetically readable portion.

14. A security control system configured to grant a visitor access into a premise, the security control system comprising:
a determination circuit configured to determine an identification tag;
a transmitter configured to transmit the identification tag to the visitor;
a first scanner configured to scan the identification tag of the visitor;
a first authentication circuit configured to authenticate the identification tag;
a generator configured to generate an approving signal upon positive authentication of the identification tag;
a dispenser configured to dispense an identification token;
a second scanner configured to scan the identification token; and
a second authentication circuit configured to authenticate the identification token to grant the visitor access into the premise.

15. The security control system of claim 14, wherein the security control system is configured to receive personal data of the visitor.

16. The security control system of claim 15, wherein the first authentication circuit is configured to authenticate the personal data.

17. The security control system of claim 14, further comprising a receiver adapted to receive the identification token.

18. The security control system of claim 14, wherein the identification tag comprises an optically readable image.

19. The security control system of claim 18, wherein the optically readable image comprises at least one of a barcode or a quick response code.

20. The security control system of claim 14, wherein the identification token comprises at least one of a radio-frequency identification chip or magnetically readable portion.

* * * * *